(12) United States Patent
Thakur et al.

(10) Patent No.: US 6,916,997 B2
(45) Date of Patent: Jul. 12, 2005

(54) WEIGHT SENSORS HAVING CENTRALIZED LOOSE TOLERANCE UNIVERSAL FORCE AND MX/MY MOMENTS OVERLOAD STOPS

(75) Inventors: Rajeev Thakur, Lake Orion, MI (US); Alexander Golshteyn, Southfield, MI (US); Russ Watts, Ann Arbor, MI (US); Darren Lee, Canton, MI (US); Rajesh Das, Clarkston, MI (US)

(73) Assignee: Robert Bosch Corporation, Broadview, IL (US)

( * ) Notice: Subject to any disclaimer, the term of this patent is extended or adjusted under 35 U.S.C. 154(b) by 207 days.

(21) Appl. No.: 10/313,777

(22) Filed: Dec. 6, 2002

(65) Prior Publication Data

US 2003/0106723 A1 Jun. 12, 2003

Related U.S. Application Data

(60) Provisional application No. 60/337,774, filed on Dec. 7, 2001.

(51) Int. Cl.$^7$ .................. G01G 19/52; G01G 23/02; B60R 21/32
(52) U.S. Cl. .................. 177/136; 177/144; 177/229; 180/273; 280/735; 73/862.629
(58) Field of Search .................. 177/136, 144, 177/211, 229; 180/273; 280/735; 73/862.629–862.634, 862.636–862.639; 701/45

(56) References Cited

U.S. PATENT DOCUMENTS

| | | | | |
|---|---|---|---|---|
| 5,810,392 A | * | 9/1998 | Gagnon | .......... 280/735 |
| 5,991,676 A | * | 11/1999 | Podoloff et al. | .......... 701/45 |
| 6,069,325 A | * | 5/2000 | Aoki | .......... 177/136 |
| 6,161,891 A | * | 12/2000 | Blakesley | .......... 296/65.01 |
| 6,201,480 B1 | * | 3/2001 | Aoki | .......... 340/667 |
| 6,231,076 B1 | * | 5/2001 | Blakesley et al. | .......... 280/735 |
| 6,323,443 B1 | * | 11/2001 | Aoki et al. | .......... 177/144 |
| 6,323,444 B1 | * | 11/2001 | Aoki | .......... 177/144 |

FOREIGN PATENT DOCUMENTS

| | | |
|---|---|---|
| DE | 199 48 045 A1 | 6/1998 |
| DE | 199 48 045 A1 * | 6/1998 |

* cited by examiner

Primary Examiner—Randy W. Gibson
(74) Attorney, Agent, or Firm—Innovation Law Group; Jacques M. Dulin (57) ABSTRACT

Automotive load cells having centralized, multi-axis, loose tolerance overload/limit stops provide improved strain gauge response. The modular, integrated stop assemblies magnify sensor substrate deflection by use of opposed concave (Belleville) springs are used in direct contact with the substrate to accommodate ±Z axis deflection and Mx/My moment angular rotation. A flanged guide member on the load stud permits a wide range of geometries. The substrate is thickened around the load stud hole and the outboard support bolt holes. Hollow rivets assist in design modularity. Strain gauges are placed at the yield zones symmetrically with respect to the X axis. The substrate hole Mx/My gap is larger than the stop bracket hole to insure a positive stop for Mx/My moments prior to yield. The inventive multi-axis stop assembly is used in any type load cell, including rectangular, thinned, notched, necked/dogbone, or cantilever substrates with any strain gauge layout configuration.

16 Claims, 11 Drawing Sheets

Center Stud limited by flange of limit-stop-guide against top face of limit-stop-bracket & flange of load-stud against bottom face of limit-stop-bracket.
Note: Sensor can still move down in Z direction (But without rotation)

WEIGHT SENSORS HAVING CENTRALIZED LOOSE TOLERANCE UNIVERSAL FORCE AND MX/MY MOMENTS OVERLOAD STOPS

CROSS-REFERENCE TO RELATED CASE

This is the Regular U.S. Application of U.S. Provisional Application Ser. No. 60/337,774, filed by us on 7 Dec. 2001, entitled Loose Tolerance Overload Stop Assembly for Load Cells, the priority of which is claimed under 35 US Code 119, and related treaties.

FIELD OF THE INVENTION

This invention relates to automotive occupancy weight sensor systems, and more particularly to improved load cells for automotive seats. The inventive load cells include compact, multidimensional, centralized, loose tolerance universal force and Mx/My moment stops for weight overloads that permit lower cost manufacturing and higher sensitivity of the load cell in the measurement range while preventing damage in overload situations.

BACKGROUND OF THE ART

Motor vehicles are equipped with safety belts and airbags for passenger safety. A wide variety of occupant sensors provide input to the Airbag Control Module (ACM) relating to the presence or absence of occupants in the several seats served by these safety devices. Prior patents show ultrasound and IR sensors, capacitance sensors, floor mat weight sensors and seat sensors. The latter include capacitance and weight sensors, to name two principal types. The trend in recent years is to employ occupant weight sensors in association with the automotive seat that provide weight data to the ACM, to determine whether or not to deploy the airbag, dependent on occupant seating conditions.

Further, in the case of smart airbags, the rate of inflation, the extent of inflation (gas quantity), and the timing of inflation may be controlled depending on the sensed weight of the seat occupant. For seat belts, the tension of the seat belt of a particular seat can be adjusted, e.g., by taking up slack prior to crash event, by the firing of seatbelt squibs upon sensing of an imminent crash combined with signal data indicative of the presence of an occupant in the selected seat.

Occupant weight sensors that are mounted in association with an automotive seat include a wide variety of types, design configurations and mounting locations. One class of sensors includes full or partial mat type sensors that employ pressure contacts; these mats can be integrated into the seat cushion and/or the back cushion.

Another significant class is that of load cells, also know as seat weight sensors that employ thick or thin film strain gauges that are screen printed on a steel substrate to measure the weight of a seated occupant in an automotive seat. The sensor substrate is typically a steel plate on the order of a few millimeters in thickness to provide a selected deflection before yielding.

It is essential to keep the deflection of the sensor substrate in the elastic region of the sensor substrate material's yield strength over the typical range of automotive use, including environment temperature variation, which is on the order of −40 to +90° C. Deformation beyond the elastic limit of the substrate under load can result in false or distorted sensor output and ultimately to mechanical or electrical failure of the sensors, including physical separation of the sensors from the substrate. Of course, erroneous or false readings or failure will lead to improper inputs to the airbag controller, possibly resulting in deployment when the seat is empty, or non-deployment when it is occupied, both unwanted results.

One largely ignored problem is that seat and occupant loads are not purely vertical. Forces and moments from all directions come to the sensor. Current sensor designs have components and mechanisms which filter out all loads except pure vertical loads before they come to the sensor. This is expensive, adds weight to the seat and also occupies precious packaging space in the seat. If the moments are not filtered out, the sensor substrate can quickly fail under a twist about the longitudinal or transverse axis of the sensor—without an overload stop for moments. The Z axis is the vertical axis through the stud and is also called the load axis. The rotation of the load stud around the X and Y axes gives rise to moments, Mx and My, respectively. These moments can disproportionately affect sensor outputs. Even small yields can lead to false, erroneous readings or failure. Significantly, typical non-load-stop design sensors can be strong in the Z axis, but weak under an Mx or My moment.

The strain gauges are distributed on the sensor substrate in a wide variety of geometric configurations, typically symmetrical with respect to the longitudinal and lateral axes of the sensor substrate plate, and are connected in full Wheatstone bridge configuration to measure the strain caused by weight-induced bending, primarily in the vertical direction. A discussion of the complex processes involved in the construction of thick film strain gauges is found in DE 199 48 045 A1 (1998; Takata Corp., Shiga, JP; H. Aoki), the thin film strain gauges of which are disclosed on the longitudinal axis of the sensor substrate at the juncture of thinned-down regions flanking a center lug and intermediate of the two end lugs.

The load cells are used in an array, typically distributed under the four corners of the cushion pan or the coordinate location on or in association with a seat track, or other seat support structural component(s). The strain gauge signal outputs are analyzed by a microchip in accord with well-understood algorithms to provide appropriate input to vehicle restraint system(s), such as smart airbag modules, seat belts, pretensioners, warning systems and the like.

Examples of various types of sensors, mounting locations and circuits that are shown in the art include: U.S. Pat. No. 6,161,891 (1999; CTS Corp.; Blakesley) which employs a dogbone design sensor substrate with resistors on the juncture of the necked-down region between two end lugs; U.S. Pat. No. 5,991,676 (1996; Breed Automotive Technology, Inc.; Pololoff et al.) which employs circular variable resistance force sensors mounted around the four seat corner mounting bolts; U.S. Pat. No. 6,069,325 (1998; Takata Corp; Aoki) which employs seat mounts having pivoting lever arms associated with load sensors; U.S. Pat. No. 6,231,076 B1 (1999; CTS Corporation; Blakesley et al.) which employs stepped sensor substrates mounted diagonally between the sides of an angle bracket between the seat pan and seat slide rail; U.S. Pat. No. 6,201,480 B1 (1998; Takata Corporation; Aoki) which shows load sensors on the four corners of a seat and a variety of Wheatstone bridge circuit configurations; and U.S. Pat. No. 5,810,392 (1997; Breed Automotive Technology; Gagnon) which s hows compression type sensors located in the seat cushion between a rigid member and the seat pan, the seat having an internal spring grid to bear a portion of the occupant weight.

The thickness dimension of the sensor substrate, being relatively thin, limits the load capacity of the sensor substrate. That is, if the sensor substrate is too thick, it will not measurably deflect under load, the deflection is difficult to measure, or the measurements become inconsistent and subject to thermal condition interference (thermal noise). To prevent the sensor substrate from failing load limit stops are employed. These stops, typically provided by support brackets, limit the load stud travel in the up and down direction and prevent excessive rotation (moments about longitudinal and lateral axes).

To obtain greater range of gauge readings, the sensor substrate can be made thinner, but the serious disadvantage is that the range of deflection before yield is reduced, and the load capacity of the load cell is reduced. In addition, thinner substrates are more prone to distortions and failure under Mx and My torsional forces. Since the load cells are expensive to produce, and generally are currently assembled and mounted to the seat during seat construction, adding more load cells is not a realistic alternative. The current load cells require very high precision, the deflection travel amounting typically to ±0.05 mm. This precision is difficult to achieve, particularly over large production runs, and even more difficult to maintain over time within the environmental conditions of automotive use, particularly vibration, large thermal range, and passenger misuse. Further, failed load cells are difficult and expensive to repair, as they generally require substantial, if not entire, disassembly of the seat.

Two recent patents, Aoki U.S. Pat. No. 6,323,443 and Aoki U.S. Pat. No. 6,323,444, are directed to load sensors in which concave springs are used as spacers on the load stud. In the '443 patent, stops are provided for vertical Fz load and transverse Fy forces in several designs. In one design (FIG. 3) where the substrate is supported at its ends by solid bolts and the load is borne in the centrally located load stud, the load bolt has minimal clearance with respect to the substrate. An upward Fz stop is provided by a large under-hanging flange of a retainer collar. A larger gap between a shoulder on the collar and a base plate (not the substrate) provides an Fy stop. In a second, cantilevered design (FIG. 4) where the substrate is supported only at one end, a non-load bearing rod projects through a restriction hole in the base plate and terminates in a flange. The flange and hole in the base plate provide de-centralized up Fz and lateral Fy stops. A down Fz stop is provided by the clearance between a substrate-securing bolt and the underlying base plate; again this stop is not centralized. The concave springs do not bear on the substrate. Significantly, no mention is made in the '443 patent regarding any mechanical stop or limit features to address the serious Mx/My problems.

The Aoki '444 patent is an application of the principles of the '443 patent, disclosing complex cantilevered designs which are described as applying moments to the outboard, unsupported ends of the sensor substrate, which is securely bolted to a base plate only in the center. Mx/My as applied to a central load stud and centralized stops are not disclosed. This patent states that all loads are absorbed by the pivot mechanism, and only vertical loads are allowed to reach the middle of the sensor substrate. Accordingly, there is a current unmet need in the art to provide load cell type seat sensors that, inter alia: have moment stops for Mx and My; have centralized stops for Fz, both up and down, for Fx and Fy, both directions, and for Mx and My moments; are modular; can be pre-assembled and mounted as a drop-in unit at the time of seat construction; are independent, as to their performance, of the precision of manufacture of seat components; are modular for swap-out repair; maintain excellent, repeatable response with precision over full load range; are less susceptible to automotive environmental noise (e.g., vibration and thermal noise); are easy to manufacture with less rigorous tolerances; have universal basic sub-assemblies that can accept a range of selected additional parts permitting them to be tailored to a wide range of seat designs; are robust; and are low cost to manufacture, install and repair.

THE INVENTION

Summary, Including Objects and Advantages

The invention is directed to load cell assemblies and to both non-limit stop design and loose tolerance limit stop design load cell sub-assemblies for automotive occupant seat weight sensors. More particularly, the invention is principally directed to mechanical limit stop assemblies for a central load bearing stud for Fz, Fx, Fy and Mx/My moments. The inventive stop assemblies magnify the deflection by use of one or more springs, preferably opposed springs to accommodate negative (downward) deflection due to load on the automotive seat, Fz down, and positive (upward) deflection, Fz up, lateral forces Fx, Fy, and moments in X and Y, Mx/My.

In the current best mode embodiment, the Z load deflection is magnified (far greater) by use of a pair of disc springs, preferably Belleville-type springs, in conjunction with each load stud. The concave or Belleville springs also magnify the angular cant of the stud under Mx and My moments to permit greater sensor stability under torsional loads. It is important that the concave or Belleville springs bear directly on the substrate, and are softer than the substrate, i.e., less stiff in lb/mm. Accordingly, the load cell system stiffness before load limit is reached is the sum of the stiffness of the substrate and the concave springs, and the vertical travel to the stop engagement is the travel of the substrate plus the travel of the spring.

In addition the inventive directly mounted concave springs design is applicable to non-limit-stop design load cells to provide greater travel, both in the Z direction and to compensate for Mx and My moments.

In accord with the invention, the use of springs, particularly Belleville-type disc springs, permits larger travel of the stud, both vertically and angularly a round X and Y axes, before engaging the limit stops without the sensor substrate being overstressed to permanent deformation, that is, while the sensor substrate remains within its elastic region. By way of example, the Fz, vertical, limit stop gap in commercially available load cells is on the order of 0.1 mm. This means that the load cells, and particularly the load studs and stop sub-assemblies must be manufactured to high precision, which is difficult to do on a consistent basis over millions of units. In contrast, and as one of the key objects and advantages of the invention, the use of the concave springs in the inventive load stop assemblies permits the Fz limit stop tolerances to be on the order of 0.5 mm, a 5-fold magnification.

Further, the centralized design, that is, having the multi-axis stops centralized around the load stud, in combination with the much larger tolerances which are compensated-for by the concave springs, permits true modularity of the sensor sub-assembly as a drop-in part for assembly or repair.

It is an important aspect of the invention that the concave springs are selected to be softer than the sensor substrate, that is, they have yield characteristics substantially greater than the sensor substrate, so that each spring slowly elastically deforms under load while transferring load to the sensor substrate. It is important to note that the deformation compensates for moment around the X and Y axis, permitting the greater angular movement of the load stud under Mx and My by the fact that opposed sides of the opposed spring slowly elastically deform until the load stud reaches the Mx/My stops before the substrate reaches yield under X and/or Y axis deformation.

The net equation for the Deflection of the sensor load stud becomes: D(F)=F (1/sensor substrate spring rate+1/spring rate), which shows that the spring effectively magnifies the travel both in Z and angularly for Mx and My, thereby permitting significantly larger tolerances which are easier and cheaper to manufacture. Applied force is associated to deflection of the spring and the sensor substrate through Hook's law, with the spring constants for the spring and sensor substrate being involved. Once the limit stops engage, the force (occupant weight downwardly or the vehicle chassis upward travel) will be distributed principally among the three components, the spring, the sensor substrate and the load stop. As a limit stop is much stiffer than the combination of the spring and the sensor substrate, any additional load to the sensor substrate is the consequence of the limit stop member deforming.

When a force/load initially is applied in the downward direction on the seat, the force is transmitted through the upper disc spring to the top surface of the sensor substrate, and thence longitudinally in the sensor substrate to the mounting bolts and then to the support bracket. As the load is increased, the load stud in the center of the sensor substrate moves downwardly, compressing the disc spring, which in turn compresses the sensor substrate top surface causing the sensor substrate to deflect. The stiffness of the spring is lower than the stiffness of the sensor substrate, so the spring compresses differentially more than the sensor substrate deflects. The travel of the center load stud is the sum of the travel under compressive forces of the upper disc spring and the sensor substrate. When the combined travel is equal to the tolerance gap, e.g., here 0.5 mm, a stop shoulder of the center load stud assembly (here the guide member) engages with the limit stop bracket. Further travel of the load stud, disc spring, and sensor substrate depends on how much flexure there is in the limit stop bracket. When the center load stud and limit stop bracket are engaged the force/load primarily travels from the center load stud to the center of the bottom support bracket, rather than laterally to the mounting bolts prior to limit stop engagement.

Conversely, when there is an upward force on the center load stud, it moves up, compressing the bottom disc spring, in turn compressing the bottom of the sensor substrate and thence laterally to the mounting bolts and then to the bottom support bracket (before the limit stop engages). Once the center load stud has traveled the gap between the bottom retaining ring or the stud flange and the bottom of the support bracket, it engages the limit stop bracket. Further travel depends on the flexure of the support bracket. The force now travels from the center stud to the center of the limit stop bracket, rather than laterally to the mounting bolts prior to limit stop engagement.

When a moment about the X or Y axis is applied, the center stud tends to rotate on those axes. Essentially, the moment applies equal an opposite forces on either side of the center stud, causing rotation. These forces are then transmitted to the sensor substrate which tends to bend in a shallow "S" shape, as seen in cross section in a plane containing the force. For a flat sensor substrate constrained at its ends, the moment about its longitudinal axis, Mx, tends to create the highest stress. Under such a moment, the center stud rotates a long with the stop guide and ultimately comes in contact with a hole in the support bracket. This limits further rotation of the stud and the sensor substrate. Thus the hole surface acts as an overload stop. In alternative inventive designs, flanges are provided on a limit stop guide member and on the load stud or its securing nut and the dimensions of the holes in the substrate and the support bracket are selected to act as stops when the load stud and/or the guide come in contact with the supporting bracket (the limit stop bracket). This process of differential, opposed compression of the concave springs permits greater angular travel of the load stud and the resulting load limiting for moments is true for moments about both the longitudinal, X, and lateral, Y, axes of the sensor substrate.

The sensor substrate can include thinned portions, considered in vertical cross section. The thinned sections preferably start a distance laterally away from the load stud center hole and extend longitudinally outwardly toward but not to the support bolt (crash bolt) holes. Preferably portions of the sensor substrate surrounding the holes are thickened for strength and to facilitate rigid attachment of the respective studs, mounting bolts and/or crash bolts. The thinned sections may extend for from about 10% to about 80% of the distance between the edge of the center hole and the edge of a support hole, preferably about 40% to about 65%, and the thinned section is preferably chamfered into the full thickness hole reinforcement regions. The thinned sections generally extend the full lateral width of the sensor substrate, but may be restricted laterally to a portion of the width. The thinning is generally symmetrical to a lateral and a longitudinal center line of the thinned section itself, but may be asymmetric.

The thin sections permit greater deformation of the sensor substrate, and an increase in deformation increases gauge signal. The thin sections also ensure that deformation is primarily due to vertical forces, since the sensor substrate is substantially wider (in plan view) than it is thick, so it is comparatively stiff in the lateral direction. Thinning also ensures the strain is concentrated in the location of the strain gauges or resistive sensors. The higher gauge output due to the thin sections ensures that the noise/error generated due to other effects, e.g., temperature, humidity, are negligible in comparison to the signal obtained from vertical force loading. For example, automotive interior temperatures typically vary from −40° C. to +90° C.

It should be noted that cross sectional thinning is not the same as lateral necking-down, the latter reducing stiffness in the lateral direction of the sensor substrate, and potentially lead to greater deformation under My moments. Both thinning and necking-down are distinct from notching, which concentrates the strain pattern at the strain gauge location. Notching preferably employs opposed chamfers that merge, while in necking-down, the chamfers are separated by an extended longitudinal section on the order of 50% the distance between the substrate hole centers.

The thin section or uniform, thin sensor substrate designs limit the load that the sensor can handle before it yields. Thus, while thinning improves sensitivity, the overall load capacity of the load cell is reduced. But the introduction of the softer springs in combination with the limit stop permits the load cell to overcome or compensate for loads higher than the measurement range, e.g., crash conditions, sudden/ panic stops, heavy occupants dropping into the seat, etc. The thin sections, or thin (but uniform) sensor substrates, travel/ flex about 0.1 mm before they yield. This is the limitation due to available material, steel. It is very expensive to ensure a precise gap of 0.1 mm in millions of units in the production environment and to maintain that precision in the automotive seat use environment. In contrast, the use of the inventive overload stop assembly employing opposed disc springs directly contacting the substrate increases the gap to from about 0.5 to about 2 mm, thus permitting looser manufacturing tolerances while maintaining the gauge sensitivity advantages of thin sensor substrate designs. In addition, the center hole in the substrate can be increased to permit looser manufacturing tolerances of that sub-assembly, as the concave springs compensate for the rotational moments around the X and Y axes. That is, there can be greater angular deflection of the stud without yield around the X and Y axes.

Thus, the inventive design includes integrated, centralized, multiple axis stops for loads and moments using the same load stud and bracket. The limit stop (support) bracket is an overload stop for Z loads in the up and down directions. The center hole in the support bracket functions as an overload stop for moments about the longitudinal axis, Mx, and the lateral axis, My. There important relationships between the geometry of the load limit stop guide, the load stud flange, the center hole in the limit stop bracket and the center hole in the substrate. The guide geometry includes its external shank diameter and the geometry of its medial flange(s) relative to the diameters of the holes in the substrate and the limit stop bracket. Importantly, the gap between the guide surface and the adjacent wall of the hole in the substrate is larger than the gap between the guide surface and the adjacent wall of the hole in the limit stop bracket. For a given sensor substrate design, it is important that the dimensions are selected so that upon angular rotation of the stud and collar (if employed) around X and Y axes, it is ensured that there is engagement with the stop bracket hole wall or surfaces before the substrate yields, that is, there is stop engagement under a moment less that the yield strength of the sensor substrate.

It is also a significant feature of the invention that the stops are located essentially coaxial with the concave springs. That is, the overload and moment stops are located just above or below the Belleville springs. This "centralized" design provides the most efficient and direct path of compensating for and transferring the overload while permitting extended travel of the load stud, both in Z and angularly.

It is another important advantage of the inventive design to provide thickened sections in the center, through which the load stud is secured via the Belleville springs, and at the outboard ends for securement with hollow rivets. The placements of the strain gauges are at the locations of onset of yield (typically where the chamfer between the thickened center and end sections and the thinner medial sections occurs) and symmetric with respect to the longitudinal X axis. This strain g auge placement and the use of thickened sections provides an optimum signal for measuring the Z load force at the center and canceling moments about Mx and My using a full Wheatstone bridge circuit.

Another significant feature of the invention is the use of hollow rivets to attach the sensor substrate to the limit stop bracket. This provides reliable clamping over the lifetime of seat usage conditions, and permits modular construction and easy assembly and replacement.

The inventive load cell design assists in ensuring that the sensor functions for the life of the vehicle. Primary servicing involves a simple change of the springs rather than replacing the entire sensor. If it needs to be replaced, it is a simple matter to drop in an entire new load cell unit, as its tolerances are independent of the seat. Further, the load cell design can be universal, in that the sensor substrate design is fixed, while only the disc springs are changed, e.g., the spring rate is selected, depending on the seat design/ geometry/projected load range.

The limit stop bracket permits the load cell assembly to be manufactured separately from the seat, thereby permitting consistent tolerance gaps for the limit stops. The assembled load cell is then dropped into the seat assembly as a modular unit. This eliminates dependence of the load cell accuracy on the tolerance of the seat components to which the load cell is attached.

Any type of strain gauges can be used: thick film strain gauges; thin film strain gauges; metal foil strain gauges; semi-conductor strain gauges; and the like. In addition, the gaps between: a) the center load stud or guide and the substrate (center hole moment gap); b) the support bracket plate hole and the center stud flange or the guide flange can be measured using eddy current, Hall effect technology, or any type of displacement gauge.

As an alternative to using disc springs, low profile custom springs or compression springs can be used. A variety or retainers or keepers can be employed, including: retaining rings; snap rings; washers; flanged studs; flanged guides; and guides or studs with shoulders, nuts, compression rings, rivets, washers, or the like.

The principles of the inventive arrangement of the Bellevilles and the central, load stud (or its guide) clearance and the loose tolerance overload stop assembly can be applied to a wide variety of sensor designs, several exemplary ones being shown and described below in the detailed description. For example, the inventive loose tolerance load stop assembly is essentially independent of the sensor substrate configuration, in all three dimensions (longitudinally, laterally and in cross-section). It is also independent of the nature of the strain gauge type, configuration, construction materials and method of construction, e.g., it can be used with both thick and thin film strain gauges of a wide variety of types and processes of manufacture: screened, printed, fused, and the like. It is independent of the sensor substrate material (type) and the particular configuration of the load and support studs and the mounting location of the load cell with respect to the seat pan, rails, supports and other components.

In another aspect of the inventive load cell assembly, a particularly advantageous design involves the use of the inventive load stop sub-assembly with a sensor substrate that includes thinned (in longitudinal and/or lateral cross section) web segments between the load stud region and one or more support regions. The sensor substrate may also include notches in the lateral dimension that are disposed between the load stud bore and the support sleeve (rivet) bores.

In still other aspects of the inventive load cell assembly, the inventive overload stop subassembly may take a variety of configurations, and the strain gauge locations may be distributed on one or more surfaces (top and/or bottom) of the sensor substrate in a variety of configurations. Advantageous configurations include a plurality of strain gauges arranged on the sensor substrate in a full Wheatstone bridge circuit, or a plurality of circuits in series or parallel. In one exemplary configuration, a pair of opposed strain gauges are located along the longitudinal centerline of the sensor substrate spaced from the load stud, while the corresponding pair are located on the transverse (lateral) axis of the sensor substrate, closer to the load stud and normal to the axis of the first pair. In another configuration, eight strain gauges may be employed, four on each side of the load stud, arrayed symmetrically along but spaced laterally from the longitudinal axis of the sensor substrate.

Thus, the inventive loose tolerance multi-axial moment and Z axis overload stop subassembly may be applied to and adapted for any type of load cell design, including non-load-stop designs and load stop designs using sensor substrates of standard rectangular, notched, necked/dog bone, cantilevered, or the like design. The capacity of the load cell, in terms of applied force (e.g., weight in pounds) can be increased by stiffening the limit stop component, and/or by selecting (increasing) the yield strength of the sensor substrate. The preferred range of measurement for the sensor substrate is in the range of about ±200 lbs. The sensor substrate type and thickness is preferred to be sufficient to not yield when a 600–1000 lb force is applied. Sensor substrate thickness typically ranges from about 1.8 mm to about 4 mm, preferably about 2 to 3 mm. For example, for a 430-type stainless steel substrate, the minimum thickness is on the order of 2 mm, and the preferred is in the range of about 2.3 to about 3 mm. Sensor substrate thickness can be reduced by reducing the measurement range, which requires subjecting the sensor substrate to a lower load. In designs where maximum measurement load is reduced, the thickness of the sensor substrate can be reduced. In addition, by stiffening the limit stop bracket, its deflection during overload is reduced. Thus, it reduces the load on the sensor substrate after the limit stop is engaged.

BRIEF DESCRIPTION OF THE DRAWINGS

The inventions are illustrated and described in more detail with reference to the drawings, in which:

FIG. 16 is a series of schematic illustrations of the effect of moment limits and the differential lateral compression of the concave springs to increase the angular travel permitted without yield of the substrate, in which

DETAILED DESCRIPTION INCLUDING THE BEST MODES OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
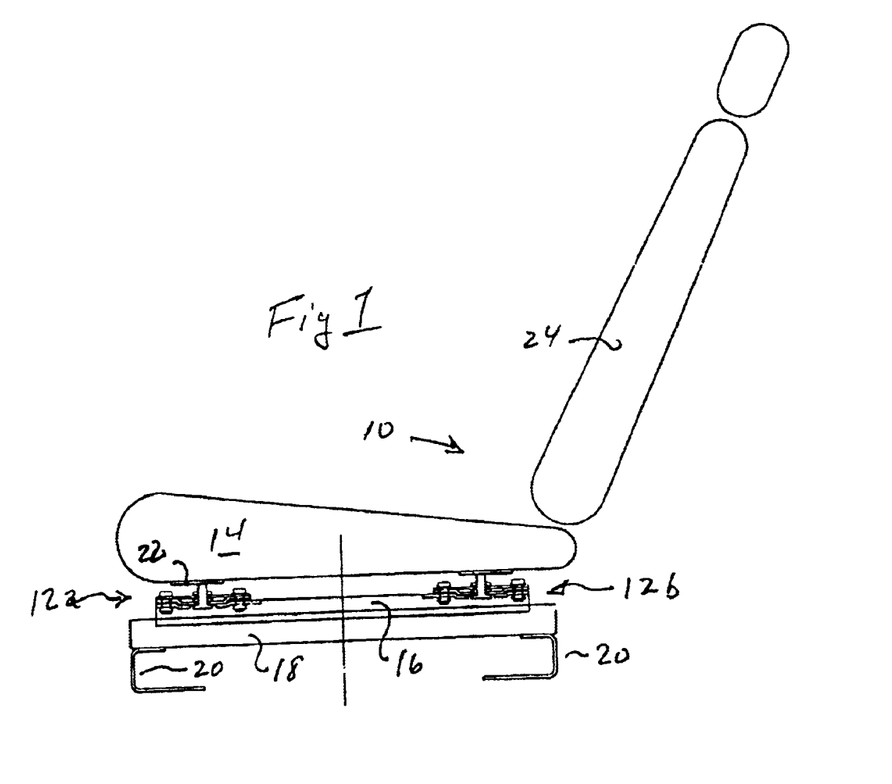
FIG. 1 is a side elevation view, in schematic and partly in section, showing a full vehicle seat with a first embodiment of a load cell of the invention mounted between the seat pan and the upper rail.

FIG. 1 is a side elevation view, in schematic and partly in section, showing a full vehicle seat 10 with a first embodiment of a load cell assembly 12 of the invention mounted between the seat 14 and the upper rail 16. The seat unit includes a lower rail 18, seat riser bracket 20, seat pan mounting plate 22 and seat back 24. The seat elements are conventional.

Four load cells are used, located generally at the corners of the seat pan, the two shown, 12a and 12b, being repeated on the other side of the seat.

Figure 2:
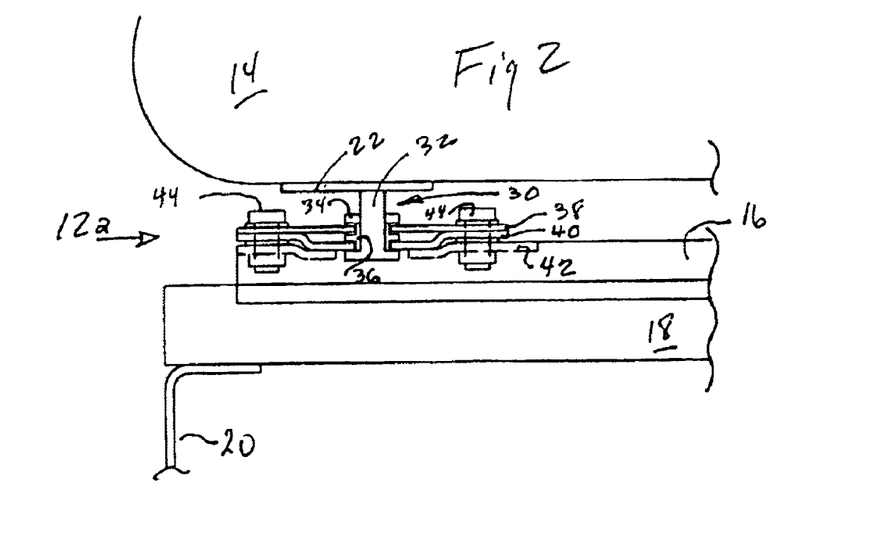
FIG. 2 is a side elevation view, in partial section, showing the load cell of FIG. 1 employing the inventive loose tolerance limit stop.

FIG. 2 is a side elevation view, in partial section, showing the load cell 12a of FIG. 1 employing the inventive loose tolerance overload limit stop assembly 30, which comprises load stud 32, hex nut 34 and load limit stop guide 36. The load cell includes sensor substrate plate 38, limit stop bracket 40, and rail mounting bracket 42, and support bolts 44.

Figure 3:
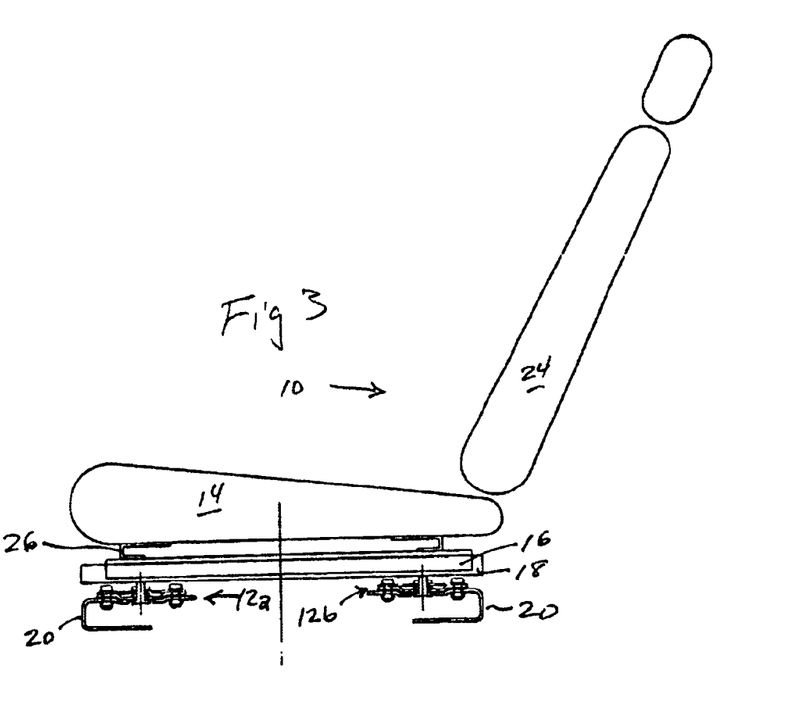
FIG. 3 is a side elevation view, in schematic and partly in section, showing a full vehicle seat with the FIG. 1 load cell mounted between the lower rail and the seat riser bracket.
Figure 4:
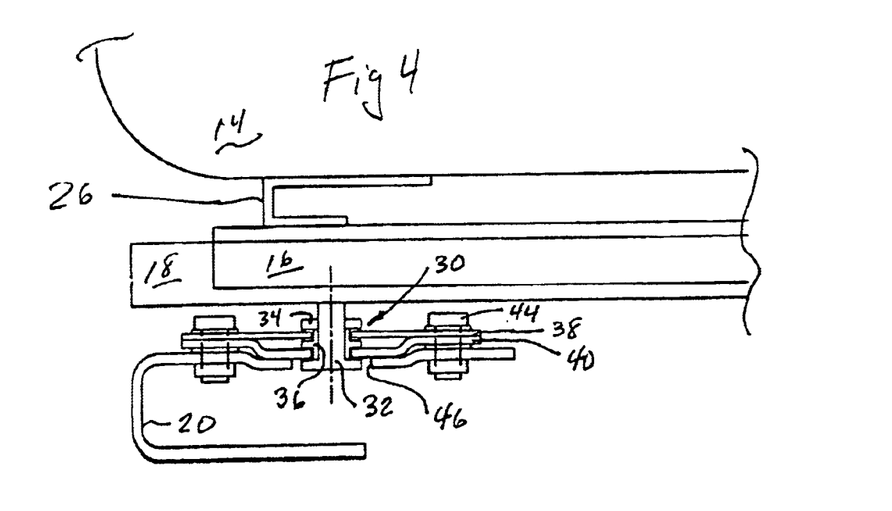
FIG. 4 is a side elevation view, in partial section, showing the load cell of FIG. 3 employing the inventive loose tolerance limit stop

FIG. 3 is a side elevation view, in schematic and partly in section, showing a full vehicle seat 10 with the FIG. 1 load cell 12a mounted between the lower rail 18 and the seat riser bracket 20. As best shown in FIG. 4, a side elevation enlarged view of the load cell mount of FIG. 3, in this embodiment of the load cell location, the lower rail 18 is mounted to the load stud 32, while the seat is mounted by bracket 26 to the upper rail. The stud head (lower end) is provided clearance by a hole 46 in the seat riser bracket 20.

Figure 5:
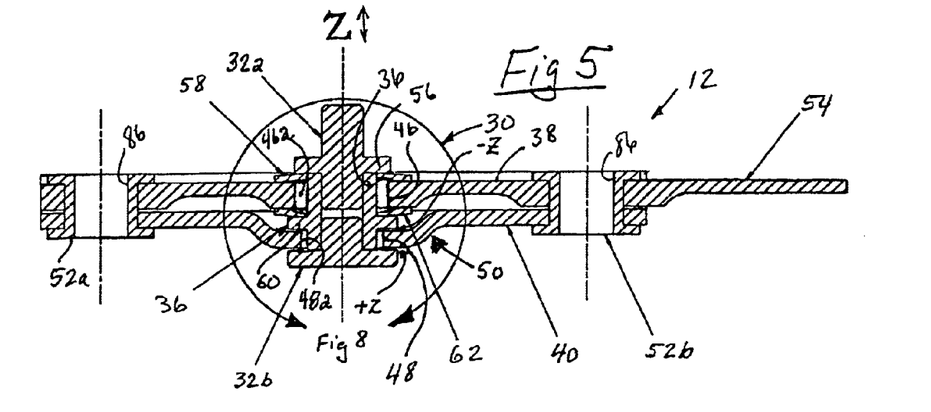
FIG. 5 is a longitudinal section view through a second embodiment of a load cell of the invention showing the detail of one embodiment of the inventive loose tolerance limit stop (multi-part load stud)

FIG. 5 is a longitudinal section view through a second embodiment of a load cell 12 of the invention showing the detail of one embodiment of the inventive loose tolerance overload limit stop assembly 30, in this case employing a multi-part load stud 32a, 32b received in the limit stop guide 36. As above, the sensor substrate plate center hole 46 receives the stop guide 36. In turn the sensor substrate is supported by the limit stop bracket 40, which in this embodiment includes a center aperture 48 for receiving the lower end of the stop guide 36 in a central recess 50. Note that the substrate gap 46a, that is the gap formed between the wall of the hole in the substrate 46 and the outer surface of the guide 36, is larger than the gap in the limit stop bracket 48a, that is, the gap formed between the hole in the bracket 48 and the surface of the guide 36. (This is also illustrated in the enlarged FIG. 8, where the gap 46a is also referred to as the Mx/My gap.) The angular compensation and magnification by the cooperation of the Belleville springs and these differential gaps is described in detail below with reference to FIG. 16A through FIG. 16D.

Both the sensor substrate 38 and the limit stop bracket 40 include coordinate holes 86 spaced from the respective center hole for receiving hollow rivets 52a, 52b in which the mounting support bolts 44 may be received (not shown in FIG. 5). These rivets are generally equidistantly spaced from the load stud hole, but may be of unequal distance, e.g., in the case of lever-arm type sensor substrate designs. In addition the sensor substrate 38 includes an extension 54 where electronic circuitry, electronic components, and connector (not shown in FIG. 5) may be placed.

The upper flange or bolt 56 of the upper portion of the load stud 32a functions as a keeper for the upper Belleville spring 58, while the medial flange 60 on the limit stop guide 36 is the keeper for the lower Belleville spring 62. The medial flange 60 is spaced along the axis of the guide 36, that is upwardly from the lower end in this FIG. 5 to provide +Z travel space between the lower face of the bracket 40 and the flange end of the lower load stud portion 32b, and Z travel space between the lower surface of the medial flange 60 and the upper face of the bracket 40. As the passenger weight load increases on the upper spring 58, it is compressed, thereby multiplying the range of measurement by the strain gauges, as described above. It can compress by the amount −Z before the limit stop medial flange engages with the limit stop bracket 40. Conversely the lower Belleville spring 62 can compress an amount +Z before the limit stop bottom flange engages with the limit stop bracket 40. The parts 32a and 32b of the load stud assembly can be press fit or threaded into the guide 36.

Figure 6:
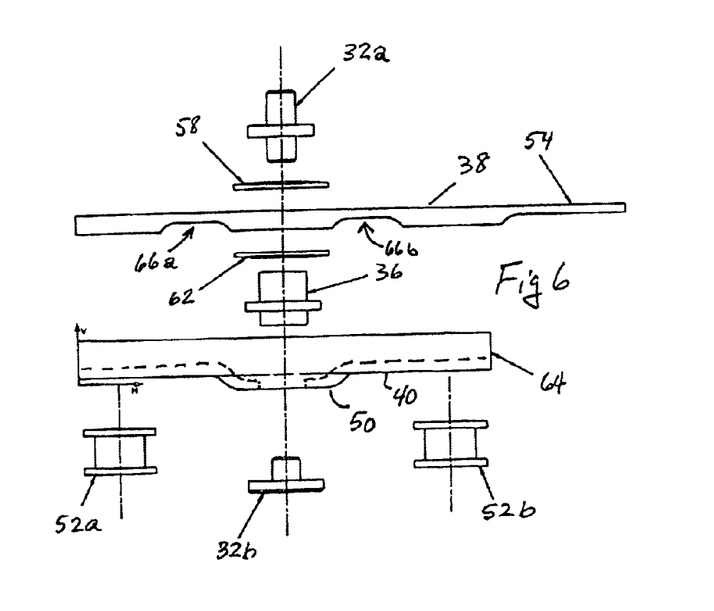
FIG. 6 is an exploded view of the load cell embodiment of FIG. 5 showing the individual parts and the assembly relationships.

FIG. 6 is an exploded side elevation view of the load cell embodiment of FIG. 5 showing the individual parts described above and the assembly relationships. Note that the limit stop bracket 40 advantageously includes longitudinal upraised side flanges 64 which function to strengthen the limit stop bracket, and shield the sensitive strain gauges and the associated circuitry or/and connector(s) from damage in use, e.g., by objects stored or intruding under the seat. In addition, the sensor substrate may include thinned sections 66a, 66b of reduced cross sectional thickness for predetermined longitudinal and/or lateral extent. Such control of the cross-sectional profile permits precise adjustment of the deformation (bending) under load characteristics of the sensor substrate. While the thinning is shown in longitudinal aspect, it should be understood that the lateral cross section may be contoured with one or more thin regions to tailor the bending characteristics of the sensor substrate for a given application.

Figure 7:
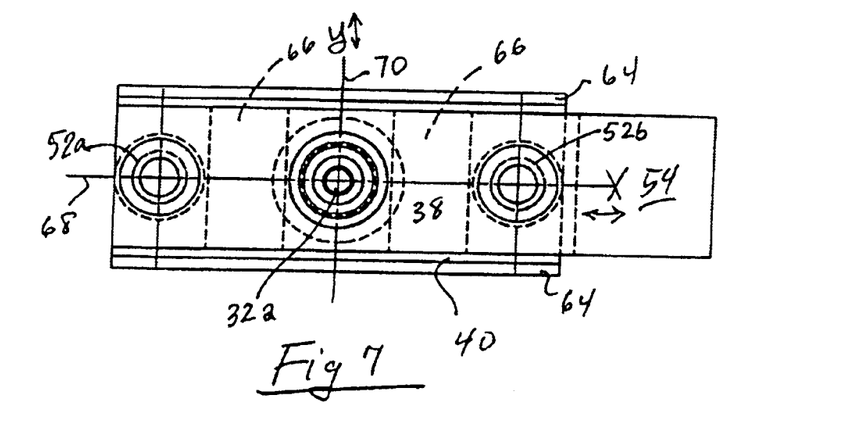
FIG. 7 is a top, plan view of the load cell of FIG. 5.

FIG. 7 is a plan view of the load cell of FIGS. 5 and 6. This figure better illustrates the upturned side flanges 64 of the limit stop bracket 40, the electronic and connector area 54, and the thinned regions 66 of the sensor substrate 38. The longitudinal axis 68 and lateral axis 70 of the sensor substrate plate and the load cell are also delineated. The coordinate arrangement of the support bolt holes in both the limit stop bracket and the sensor substrate, receiving the hollow rivets 52a, 52b, is also shown.

Figure 8:
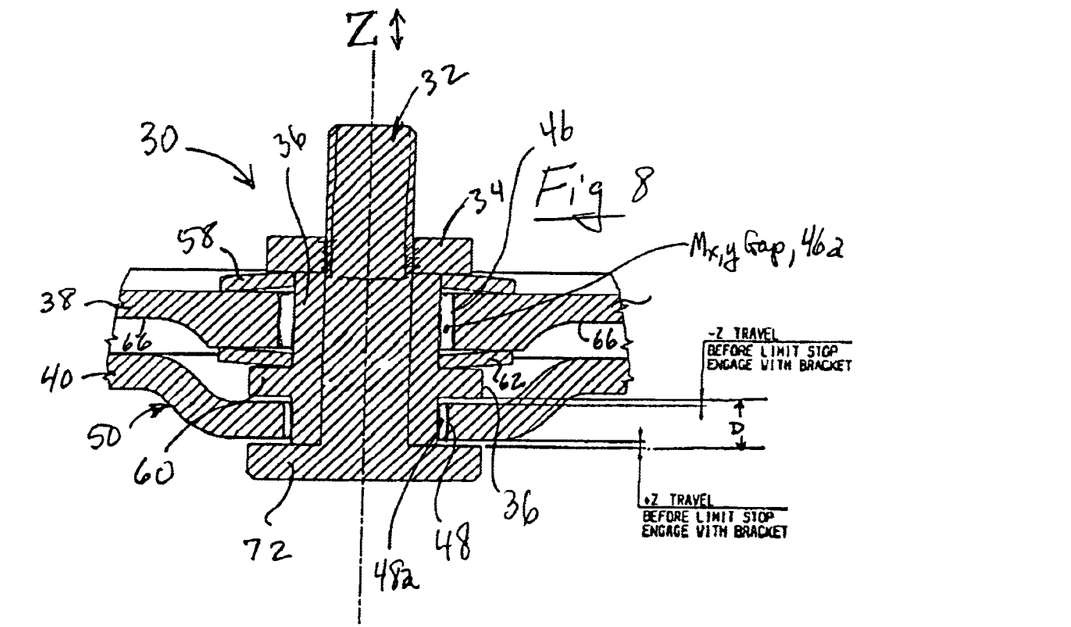
FIG. 8 is a vertical section detail along the longitudinal axis of the load cell of FIG. 5 showing a second embodiment of the inventive loose tolerance limit stop (the preferred one-piece load stud)

FIG. 8 is a vertical section detail along the longitudinal axis of the enlarged section of FIG. 5 showing a second embodiment of the inventive loose tolerance limit stop, in this case the preferred one-piece load stud 32, having an enlarged head/flange 72 that serves as the +Z travel stop of the load limit stud with the underside of the limit stop bracket 40. The −Z travel between the upper surface of the recessed section of the bracket 40 and the medial flange 60 is also shown clearly on the right of the figure. Due to the use of the two, opposed, counter-acting Belleville springs 58 and 62, the distance D (corresponding to the length of the guide between its lower end and the lower face of the flange 60, does not have to be as precise as in prior load cells, nor does the thickness of the limit stop bracket need to be machined to as close tolerances. Note the gap 46a is larger than the gap 48a.

The hex nut 34 keeps the upper Belleville spring 58. Note the Belleville springs are concave in the center (a shallow cone), and oriented in opposed relationship, that is, the centers spaced farther apart than the rims, so they slowly flatten under vertical force.

Figure 9:
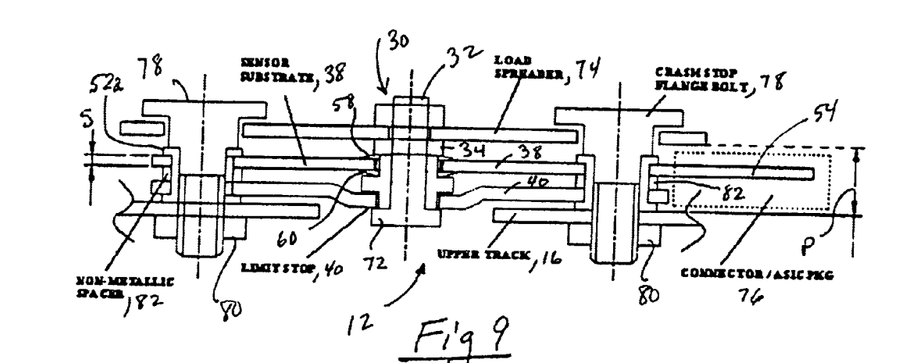
FIG. 9 is an unshaded vertical section view along the longitudinal axis of the first embodiment of the load cell of the invention as mounted between an upper track and a load spreader associated with an automotive seat pan, and showing the location of the strain gauge circuit connector to the ASIC package.

FIG. 9 is an unshaded vertical section view along the longitudinal axis of the first embodiment of the load cell of the invention as mounted between an upper track 16 and a load spreader 74 associated with an automotive seat pan, and showing the location of the strain gauge circuit connector and electronic component 76. The load cell 12 is mounted to the upper rail 16 by crash stop flange bolts 78 which also pass through the load spreader plate 74 and are secured to the upper rail by hex nuts 80. Note the limit stop bracket 40 is spaced from the sensor substrate by non-metallic spacers 82, such as Delrin or other suitable natural or synthetic organic polymeric material. The sensor substrate plate thickness is on the order of 2–3 mm, and the entire load cell dimension is on the order of 1–2".

Figure 10:
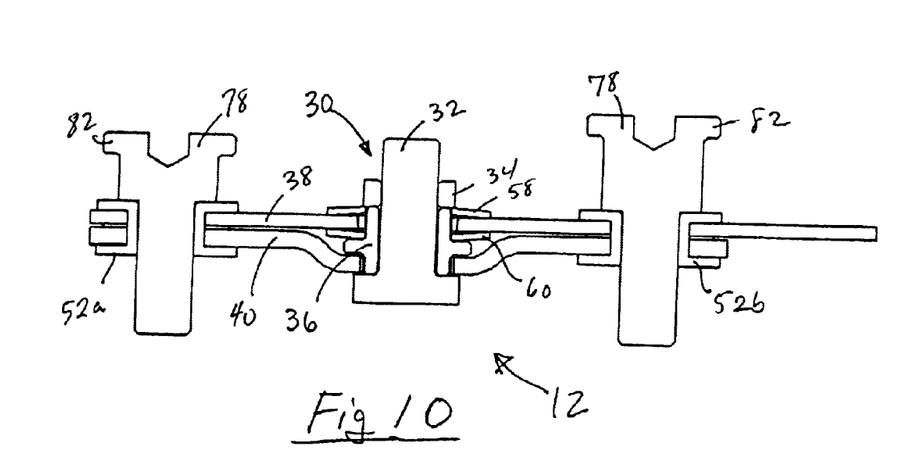
FIG. 10 is a schematic unshaded vertical section view of the inventive load cell of FIG. 9 out of the mounting context as a load cell assembly for mounting in a wide variety of seat assembly configurations.

FIG. 10 is a schematic, un-shaded vertical section view of the inventive load cell 12 employing the loose tolerance overload limit stop subassembly 30 out of the mounting context of FIG. 9, as a load cell assembly for mounting in a wide variety of seat assembly configurations. The parts numbering is as above. As the load increases the Bellville springs flatten, faster that the sensor substrate deflects, and the travel of both is stopped by the load stud and guide flanges under ordinary use conditions, and by the flanges 82 of the crash stop bolts 78 in cases of emergency or accident stops.

Figure 11:
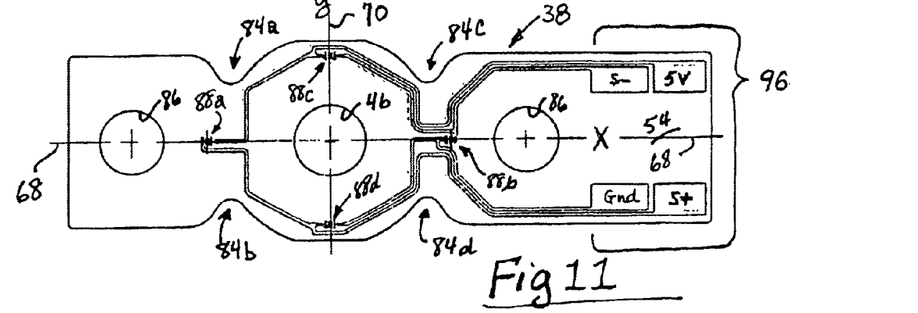
FIG. 11 is a top plan view of a load cell of the type of FIG. 10 in which the sensor substrate includes notches intermediate the center load stud and the external support studs to assist in focusing strain on the distributed strain gauges, located in this embodiment on the longitudinal and lateral axes passing through the center of the load stud.

FIG. 11 is a plan view of a suitable sensor substrate plate 38 for a load cell 12 of the type of FIGS. 9 and/or 10 in which the sensor substrate includes lateral notches intermediate the center load stud and the external support studs. In this embodiment the notches are in opposed pairs 84a-84b and 84c-84d, spaced symmetrically around the load stud hole 46, and in mirror image relationship to both the longitudinal axis 68 and the lateral axis 70. These notches assist in focusing strain on the distributed strain gauges 88. The strain gauges in this embodiment are located on the longitudinal and lateral axes passing through the center of the load stud. Two of the strain gauges, 88a-88b, are disposed outwardly of the notches, closer to the support bolts, along the longitudinal axis, while the other two, 88c-88d, are placed on the sensor substrate central section along the lateral axis of the sensor substrate. FIG. 11 also shows a convenient, balanced lead pattern for the Wheatstone bridge circuitry connecting the four strain gauges. The area 54 can be used for printing electrical circuitry for an ASIC and associated connector(s) 96. The strain gauge array configuration provides the comparison signals needed for the longitudinal deflection under load, while compensating for lateral twisting. The specific notch size, lateral depth, and location spaced from the center of the load stud hole to effect a selected response in the strain gauges is easily determined by straightforward empirical testing. For example, larger notches produce more rapid response curves of the sensor substrate under load.

Figure 12:
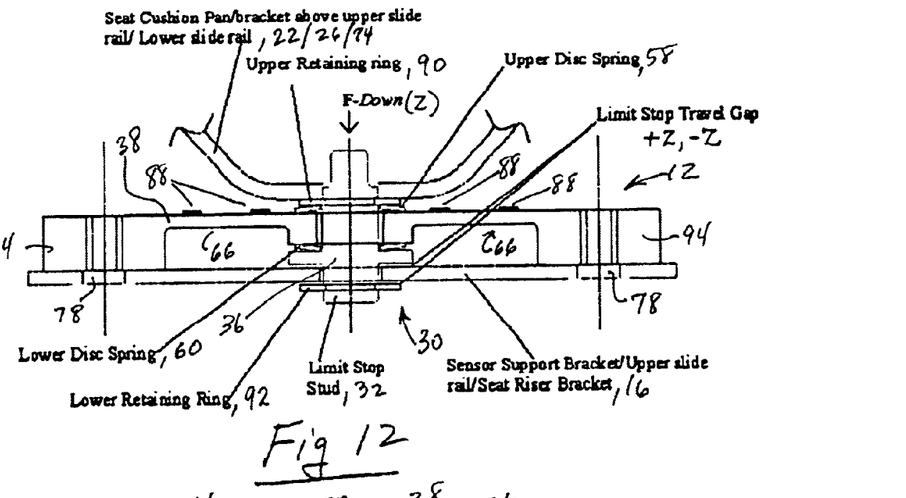
FIG. 12 is a side elevation view, partly in section of a third embodiment of a load cell of the invention showing use of the inventive loose tolerance limit stop as mounted to a support bracket, e.g., an upper slide or a seat riser bracket.

FIG. 12 is a side elevation view, partly in section of a third embodiment of a load cell 12 of the invention showing use of the inventive loose tolerance limit stop 30 as mounted to a support bracket, e.g., an upper slide or a seat riser bracket 16. The load stud is bolted to a seat pan bracket 22/26/74. In this embodiment, an upper retaining ring 90, such as a snap-on C-ring is the keeper for the upper Bellville spring, and a similar lower retaining ring 92 functions as the limit stop flange for the load stud 32. Note the thinned sections 66 longitudinally of the stud, and the enlarged support lugs 94 in which the support bolts 78 are received. The distribution of the strain gauges 88 is better shown in FIG. 13, below.

Figure 13:
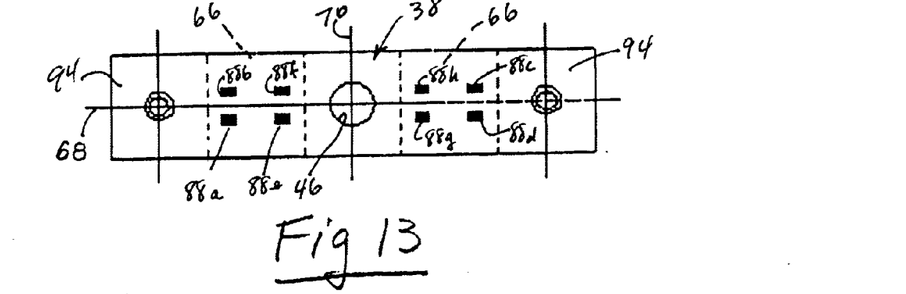
FIG. 13 is a plan view of the load cell of FIG. 12 showing the location of the strain gauges symmetrical about the longitudinal axis of the sensor substrate.

FIG. 13 is a plan view of the load cell of FIG. 12 showing the location of the strain gauges 88 symmetrical about both axes 68, 70 of the sensor substrate. In this embodiment eight strain gauges are used, and they may be wired in a wide variety of configurations: opposed Wheatstone bridges, nested bridges, in parallel and in series, by way of example. The main purpose of gauge placement symmetry is to cancel moment effects. A wide variety of other sensor and sensor substrate configurations may be employed in the inventive load cells in accord with the principles of the invention taught here.

Figure 14:
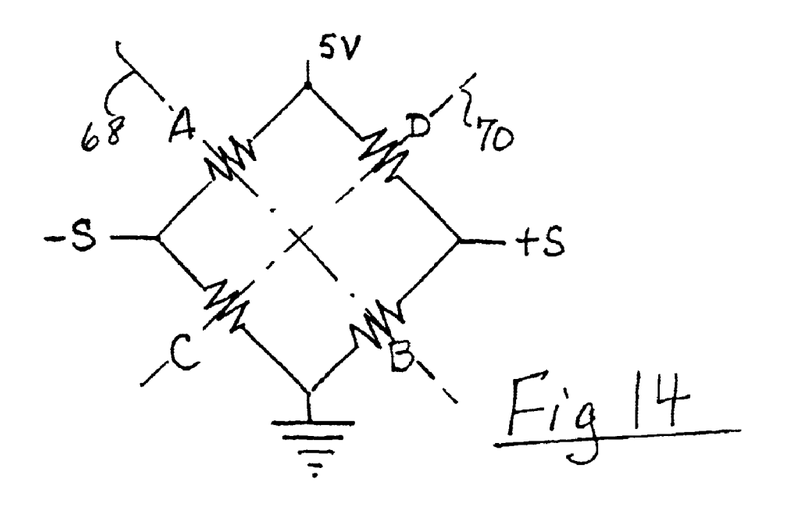
FIG. 14 is a schematic of the Wheatstone bridge circuit for the four strain gauges of the FIG. 11 sensor substrate configuration.

FIG. 14 is a circuit schematic of the Wheatstone bridge for the strain gauge sensor array of FIG. 11, relating the gauges 88a, 88b, 88c and 88d of FIG. 11 to the corresponding bridge circuit resistors A, B, C and D in FIG. 14.

Figure 15:
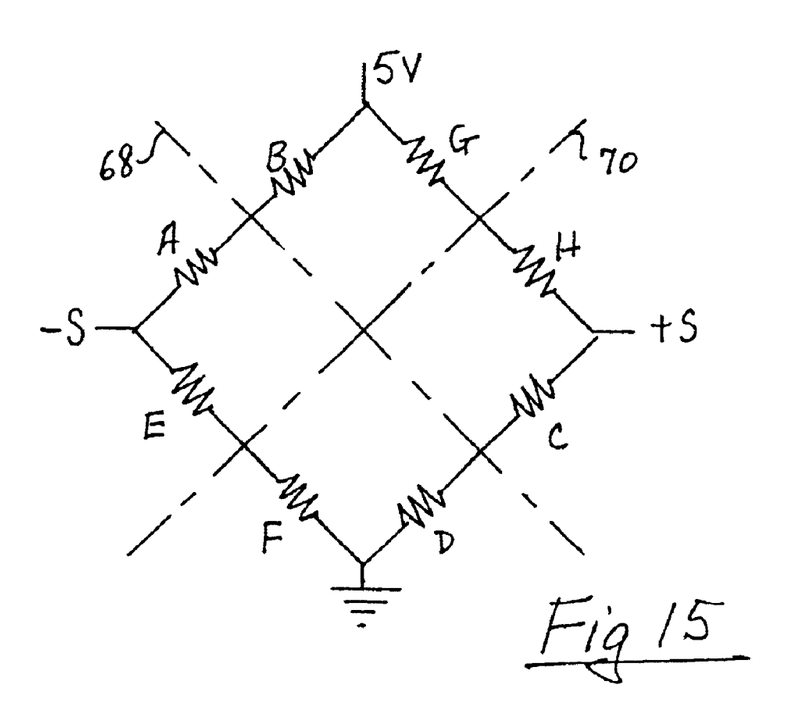
FIG. 15 is a schematic of the Wheatstone bridge circuit for the eight strain gauges of the FIG. 13 sensor substrate configuration.

FIG. 15 is a circuit schematic of the Wheatstone bridge for the strain gauge sensor array of FIG. 13, relating the gauges 88a/88b, 88c/88d, 88e/88f and 88g/88h of FIG. 13 to the corresponding bridge circuit resistors A through G in FIG. 15. Note the strain gauges are in series pairs, 88a/88b, etc. The longitudinal and lateral axes 68 and 70, respectively, are shown on both FIGS. 14 and 15.

Figure 16A:
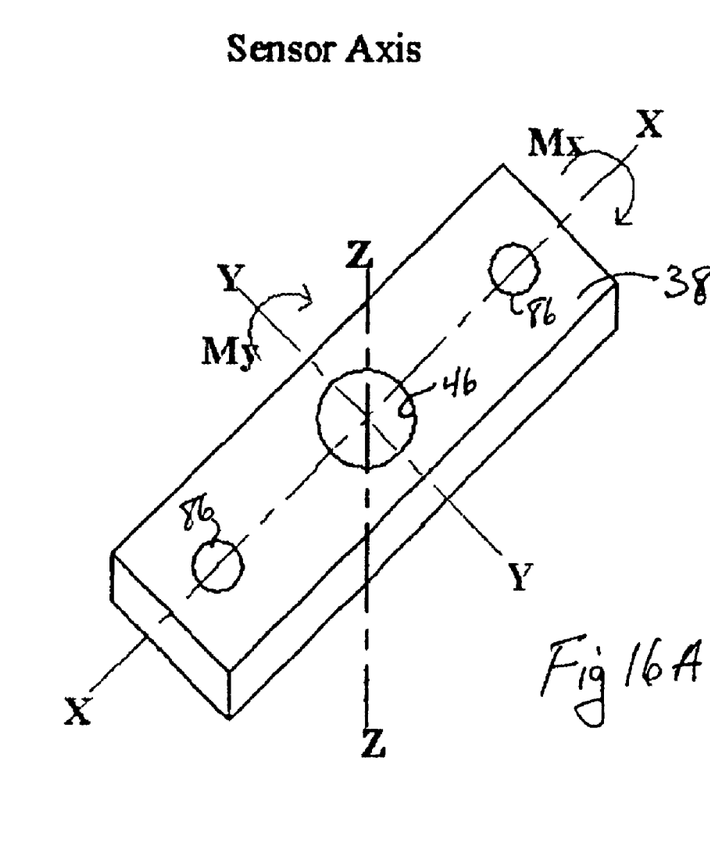
FIG. 16A is an isometric illustrating the three axes of the substrate and the Mx, My moments.
Figure 16B:
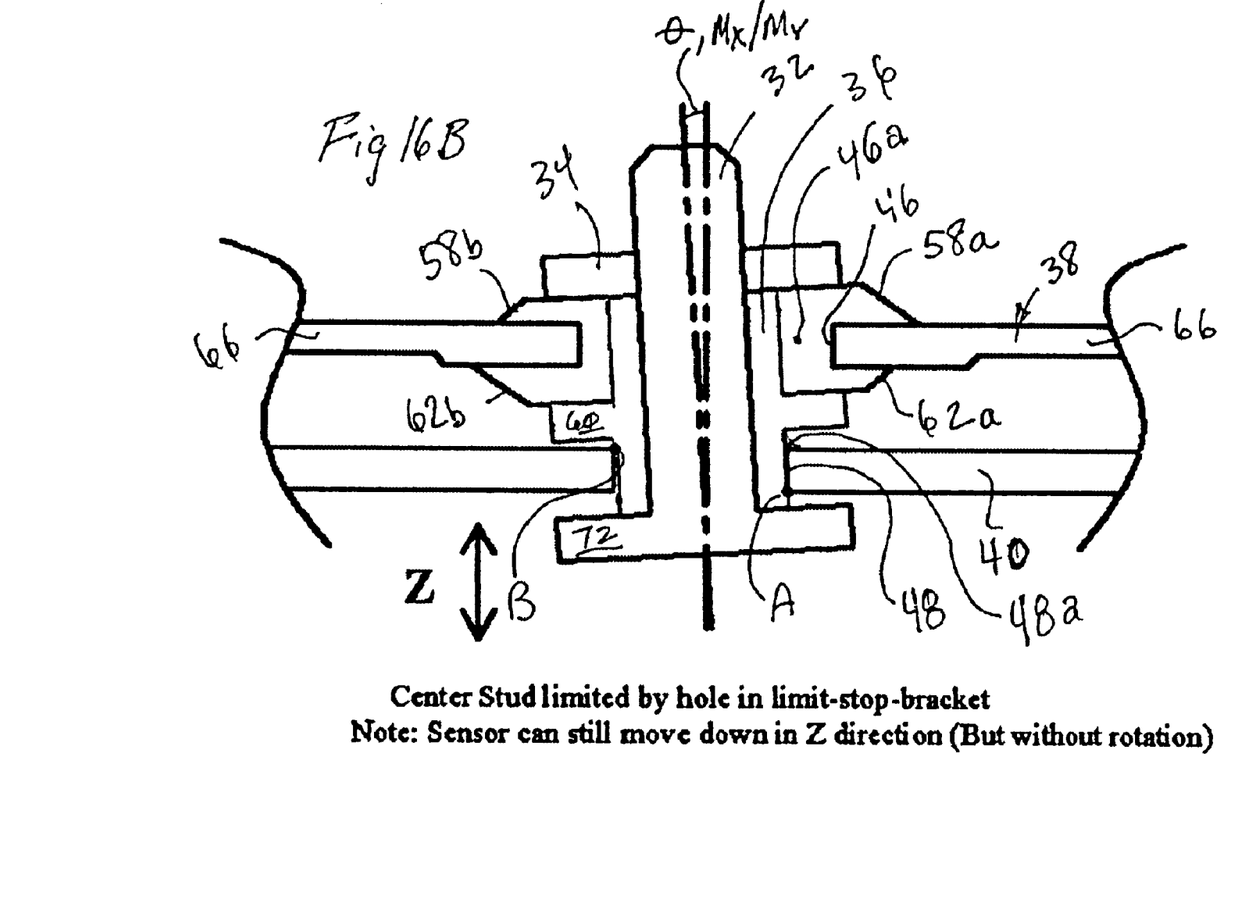
FIGS. 16B–16D show various geometries of the inventive design in which the dimensions of the load stud collar, the substrate hole size, the collar stop flange(s), the load stud stop flange, and the hole in the limit stop bracket are selected to show the centralization of the various stop points A–D for the overload direct transfer paths.
Figure 16C:
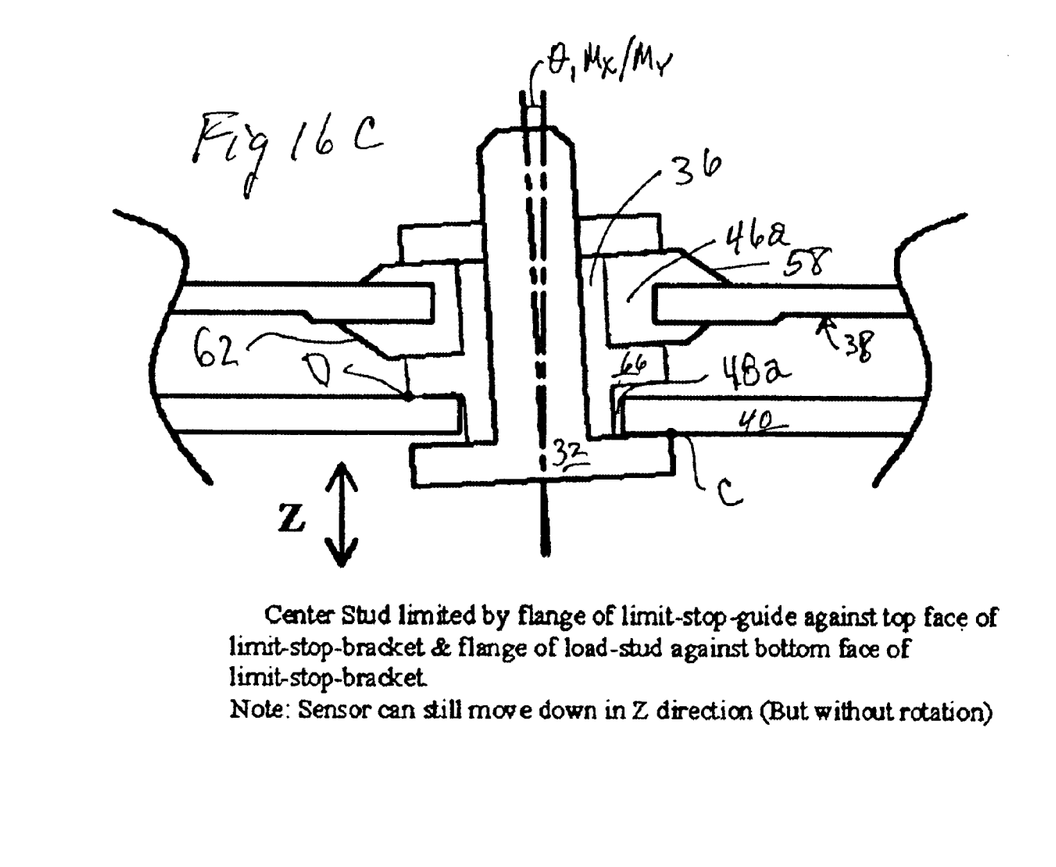
Figure 16D:
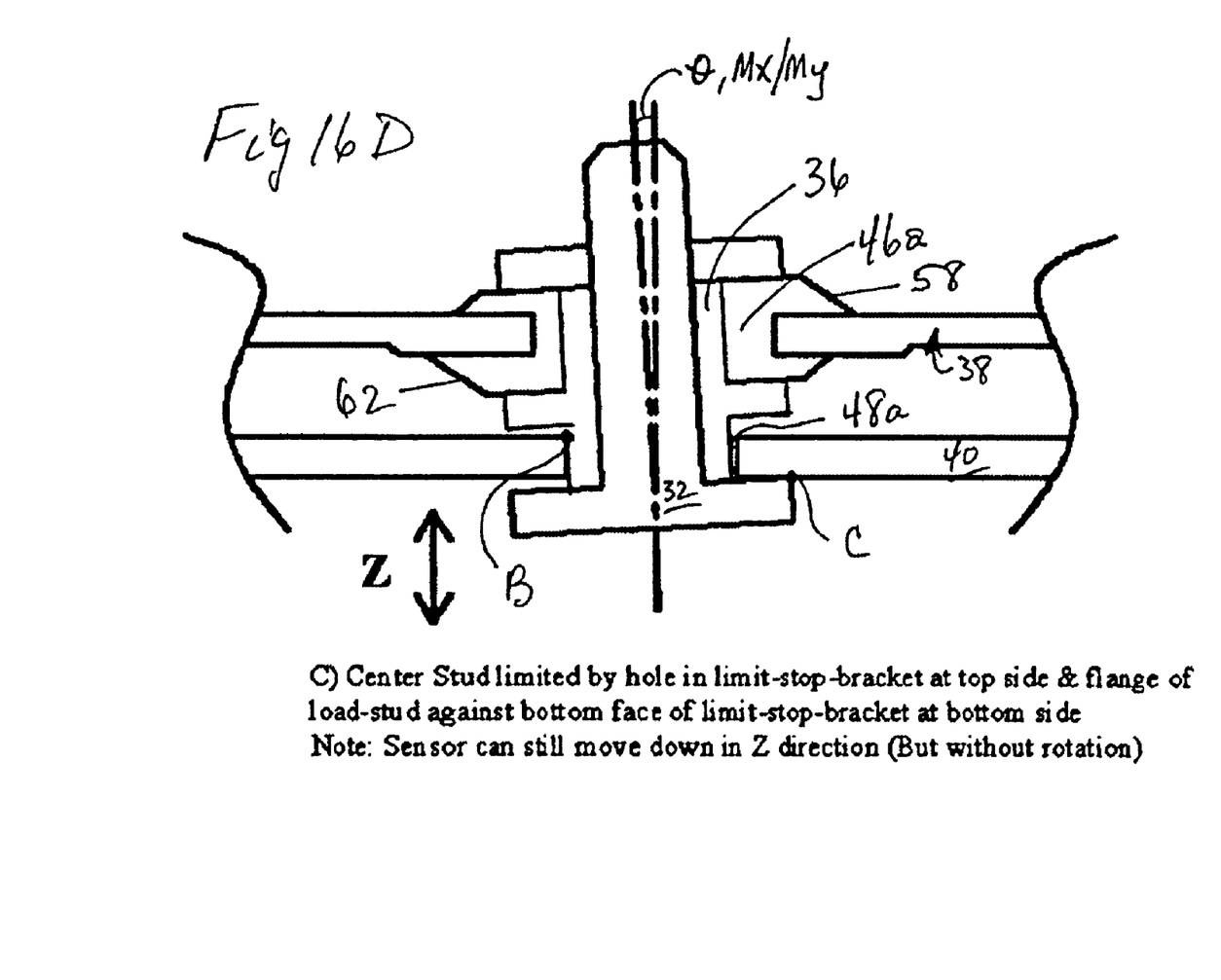

FIG. 16A is an isometric of an exemplary sensor substrate 38 showing the X, Y and Z axes, and the moments Mx and My. FIGS. 16B through 16D are a series showing the effect of the combination of the Bellevilles 58 and 62 and the differential gaps 46a and 48a. The parts numbering is the same as in FIGS. 5 and 8. As the Mx and/or My moments cause angular deviation Ø, the center load stud 32 (and/or the guide sleeve 36, as the case may be) is limited at various points A–D from further movement before yield of the substrate. Note the differential and opposite compression of the Bellevilles, shown in schematic. The upper concave spring 58 compresses more on the left side 58b than the right 58a, while the lower concave spring 62 compresses more on the right side 62a than the left, 62b due to the rotation from vertical to the left.

In FIG. 16B, the center stud rotation is limited by the hole 48 in the limit stop bracket, yet the sensor can still moved own in the Z direction without further rotation. T he stop contact points A and B at the hole margins are shown. In FIG. 16C there is a greater Z load, so the Mx/My stops are now at points C and D, at the corners of the guide flange and load stud flange, respectively. As before there is still capacity to move down in the Z direction under more load as there still is a gap under the guide flange 66 and the top of the stop bracket 40 (refer back to FIG. 8). In FIG. 16D stop points are C and D for this geometry, but Z motion is still possible. Likewise, the stop points could be at A and D, or more than two points (or surfaces) depending on the precise geometry.

INDUSTRIAL APPLICABILITY

It is clear that the inventive loose tolerance overload limit stop assembly, and the disclosed load cells will have wide applicability in the automotive industry, as the inventive design is simpler to manufacture with a lower level of critical tolerances, yet providing improved performance.

It should be understood that various modifications within the scope of this invention can be made by one of ordinary skill in the art without departing from the spirit thereof We therefore wish this invention to be defined by the scope of the appended claims as broadly as the prior art will permit, and in view of the specification if need be, including equivalents thereof.

What is claimed is:

1. Automotive seat weight sensor system comprising in operative combination:

a) a thin, generally planar steel substrate member having spaced, opposed ends, a longitudinal X axis, a lateral Y axis, and a vertical Z axis;

b) said substrate having an array of strain gauges arrayed thereon to determine the amount of load in the Z axis of said substrate;

c) a load stud mounted through a hole in said substrate medial of its ends with springs that are concave, shallow cones oriented in opposed relationship having their centers spaced farther apart than the rims and disposed with the concave side directly in contact with said substrate;

d) said medial substrate hole is configured with loose tolerance with respect to said stud to provide an Mx/My gap there between;

e) a limit stop bracket having an upper and a lower surface mounted spaced from and in association with said substrate, and having a hole through which said load stud passes;

f) stop elements carried by said stud to engage at least one of said upper surface, said lower surface and a wall of said limit stop bracket hole to provide Fz, Fx, FY stops and an Mx/My moment stop; and g) said limit stop bracket hole having a tolerance configured with respect to said stud to provide a gap smaller than said Mx/My gap so that said Mx/My stop is engaged before moment-induced yield of said substrate occurs.

2. Automotive seat weight sensor system as in claim 1 wherein said limit stop bracket is the same part used as a stop for all loads and moments, and said substrate is configured with thin and thick sections as seen in cross section and said medial substrate hole is located in a thick section.

3. Automotive seat weight sensor system as in claim 2 wherein said stop elements include spaced upper and lower flanges associated with said stud with a flange being spaced from each side of said stop bracket.

4. Automotive seat weight sensor system as in claim 2 wherein said concave spring is softer than said substrate.

5. Automotive seat weight sensor system as in claim 3 wherein said stud includes a guide member mounted thereon, said guide member is configured with at least one of said flanges, and said Mx/My gap is defined between an outside surface of said guide and the surface of said medial substrate hole.

6. Automotive seat weight sensor system as in claim 5 wherein said substrate is mounted to said limit stop bracket by at least one hollow rivet passing through a hole in a thickened end section of said substrate disposed spaced from said medial thickened section, said thickened sections being separated by at least one thin section.

7. Automotive seat weight sensor system as in claim 1 wherein the geometry of the loose tolerance of said system is selected to provide a modular unit that is easy to mount and replace in connection with an automotive seat.

8. Automotive seat weight sensor system as in claim 1 wherein the stops are central to the load stud and located above or below said concave springs to provide an efficient and direct path for transferring overload to one or more of said stops while permitting extended travel of said load stud in Z axis and angularly in rotation around at least one of the X and the Y axis.

9. Automotive seat weight sensor system as in claim 1 wherein said springs are Belleville-type springs.

10. Automotive seat weight sensor system as in claim 2 wherein said strain gauges are disposed in onset of yield zones of said substrate.

11. Automotive seat weight sensor system as in claim 10 wherein said onset of yield zones are defined by areas of transition between thick and thin sections of said substrate.

12. Automotive seat weight sensor system as in claim 5 wherein said guide is selected from a unitary and a multi-part member.

13. An improved load cell for automotive seat weight determination including presence of a passenger load, wherein said load cell is a load-stop or a non-load-stop design and includes at least one load bearing stud and a substrate plate carrying sensors thereon, the improvement comprising in operative combination: securing said load stud to said substrate with springs that are concave, shallow cones oriented in opposed relationship, having their centers spaced further apart than rims and disposed with a concave side facing and directly in contact with said substrate, said concave springs having a stiffness less than said substrate, and said load stud being configured with loose tolerance with respect to said substrate.

14. Improved load cell for automotive seat weight determination as in claim 13 wherein said load cell includes at least one moment stop Mx or My that engages before yield of said substrate.

15. Improved load cell for automotive seat weight determination as in claim 14 wherein said load cell includes stops for Fz, Fx and Fy.

16. Method of reducing load cell substrate misreading or failure due to Mx and/or My moment-induced yield, comprising the steps of:

a) mounting a load stud to a sensor substrate with springs that are shallow cones having stiffness less than said substrate said springs having a concave side and an opposed convex side, each of said concave sides facing and in direct contact with said substrate;

b) disposing said springs to compress differentially upon moments Mx and/or My being applied to said stud; and c) configuring a moment gap between said substrate and said load stud that is larger than a gap to a moment stop associated with said stud so that there is stop engagement under a moment before yield strength of said substrate is exceeded.

* * * * *